UNITED STATES PATENT OFFICE.

EDWARD P. THOMPSON, OF ELIZABETH, NEW JERSEY.

INCANDESCENT ELECTRIC LAMP.

SPECIFICATION forming part of Letters Patent No. 371,003, dated October 4, 1887.

Application filed February 28, 1887. Serial No. 229,094. (No model.)

*To all whom it may concern:*

Be it known that I, EDWARD P. THOMPSON, a citizen of the United States, residing in Elizabeth, in the county of Union and State of New Jersey, have invented certain new and useful Improvements in Incandescent Electric Lamps, of which the following is a specification.

The invention relates to the construction of incandescent electric lamps and to the method of connecting them in circuit, the object being to provide a lamp capable of being turned down or of giving but a small amount of light whenever it is desired to reduce the illumination.

The invention consists, in general terms, in constructing a small section of the filament of an incandescent electric lamp in such manner that it may be included in a separate circuit, or included in different secondary electric circuits derived from electric converters independently of the remaining portion of the filament at will. This small section may then be employed, to the exclusion of the remaining portion of the filament, whenever but a small illumination is desired.

In the accompanying drawings, Figure 1 illustrates an incandescent electric lamp, together with a system of circuits, embodying the features of the invention, and Fig. 2 illustrates the application of the invention to a chandelier. Fig. 3 illustrates a modification.

Referring to the figures, A represents an incandescent-electric-lamp globe, and B its filament. The leading-in wires $a'$ and $a^2$ support the filament in the usual manner. A third wire, $a^3$, leads to a point, $a$, a short distance above the point at which the leading-in wire $a^2$ terminates. Thus there is included between the wires $a^2$ and $a^3$ a short section, $b$, of the filament. It is designed that this section shall be included in the circuit when but a dim light is required.

The invention is illustrated as applied to a system of electric distribution in which electric converters or secondary generators are employed for delivering the currents to the lights. In this instance E represents a suitable source of intermittent or alternating electric currents, which are conveyed by conductors L L to the primary coil P of a converter, C. The secondary coil S has its respective terminals connected with conductors L' and L', from which the conductors $l'$ $l^2$ are derived. These latter conductors lead, respectively, to the terminals of the leading-in wires $a'$ $a^2$. In this manner alternating currents are delivered to the lamp as required.

When it is desired to reduce the light, a switch, $s$, included in the conductor $l^2$, may be opened, thus interrupting the connections to the leading-in wire $a^2$. The conductor $l^3$ leads from this leading-in wire to one terminal of the secondary coil $s$ of a converter, $c$. A conductor, $l^4$, leads from the other terminal of this coil to the leading-in wire $a^3$. The primary coil $p$ of the converter $c$ is included in a circuit, $l^5$ $l^6$, derived from the conductors $l'$ and $l^2$. A switch, $s'$, included in the conductor $l^5$ when closed, completes the connections through the primary coil of the converter $c$. This converter may, if necessary, reduce the potential of the current, so that the current delivered through the conductors $l^3$ $l^4$ shall be much less than that delivered to the primary coil $p$ and adapted to render incandescent the small section $b$ of the filament B. This section may, if desired, be of a different specific conductivity from the remaining portion of the filament. It will thus be seen that by opening the switch $s$ and closing the switch $s'$ the main portion of the filament may be cut out of circuit and the section $b$ included in the circuit of the secondary coil of the converter $c$. This organization will be found convenient for night-lamps and similar purposes.

Referring to Fig. 2, the invention is illustrated as applied to a chandelier. In this instance the conductors L' L' lead through the support of the chandelier to the leading-in wires $a'$ $a^2$, as before. The switch $s$ serves to make and break the connections to the terminal $a'$. The leading-in wire $a^3$ is connected by the conductor $l^4$ with a switch, $s'$, which serves to make and break the connections of the circuit when turned by means of the handle $t'$, in any convenient manner, and the conductor $l'$, leading from this switch, passes to one terminal of the secondary coil $s$ of the converter $c$. The other terminal of this coil is connected through conductor $l^3$ to the conductor L' which leads to the leading-in wire $a^2$. In this manner the section $b$ of the filament may be in- (No Model.)
W. H. IVERS.
PIANO FORTE.
No. 371,069. Patented Oct. 4, 1887.
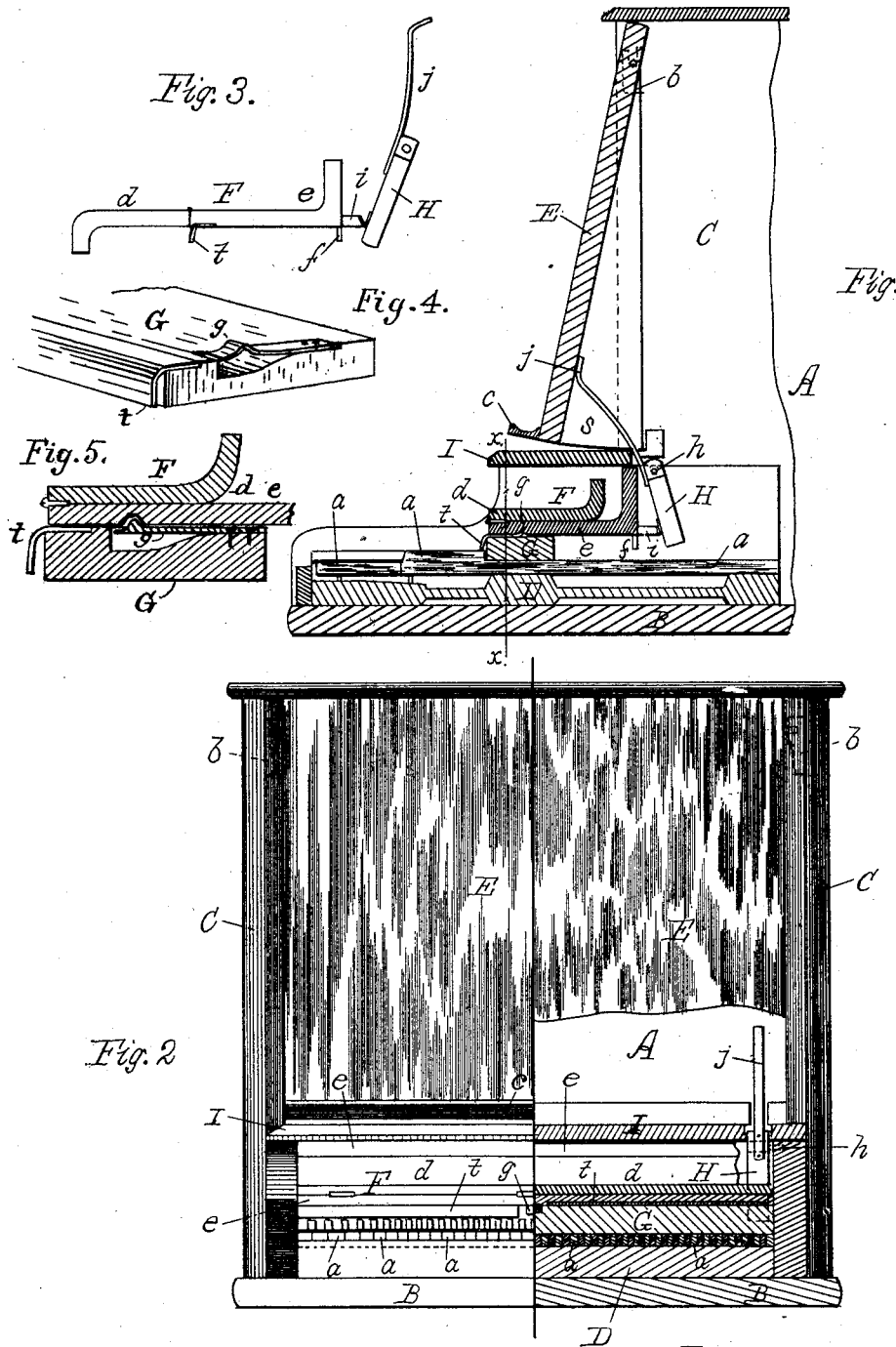
Witnesses.
H. L. Lodge
E. K. Boynton
Inventor.
Wm H. Ivers,
F. Curtis, Atty.